Patented Sept. 8, 1925.

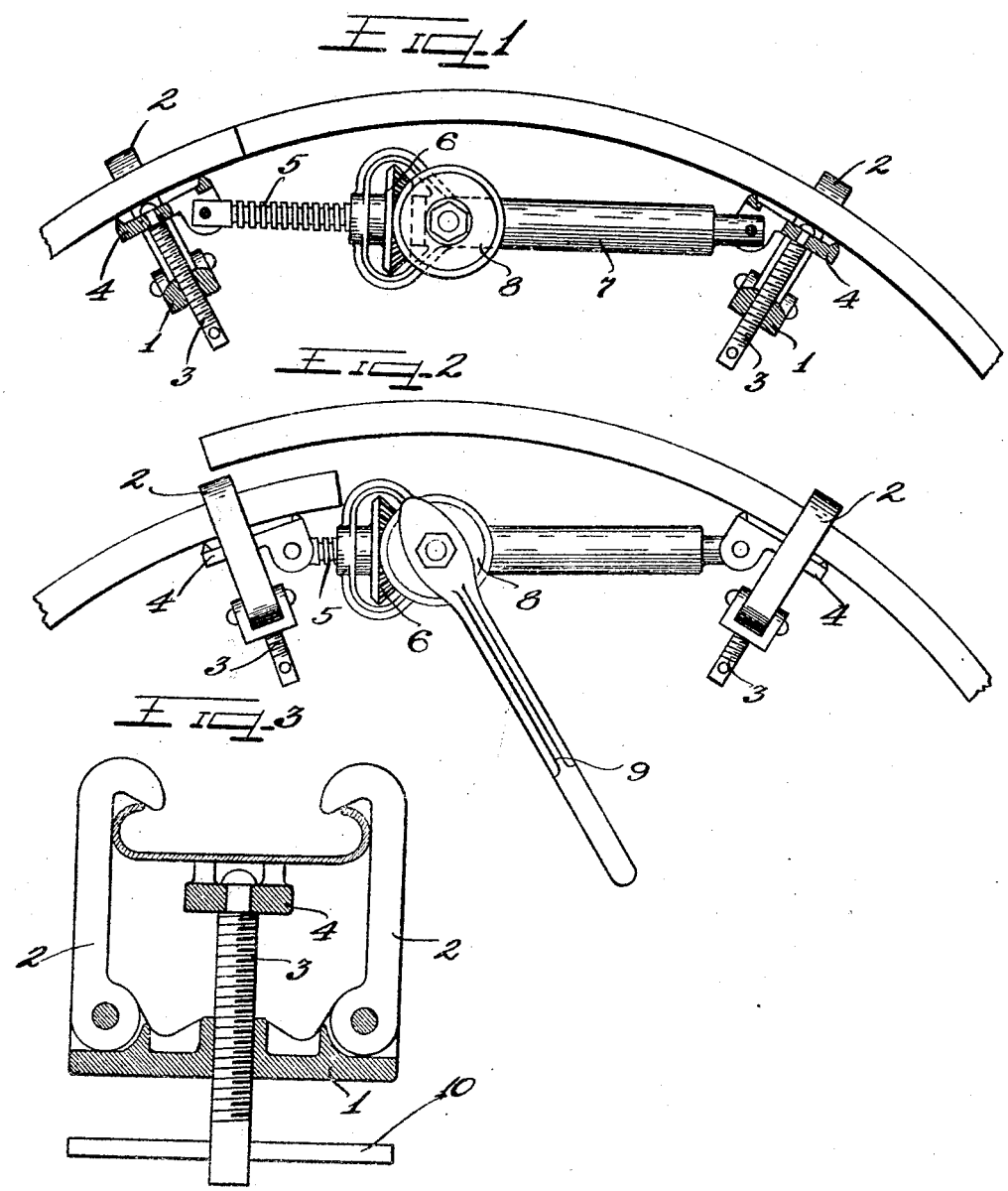

1,552,587

UNITED STATES PATENT OFFICE.

ALBERT S. WALLACE, OF CHICAGO, ILLINOIS.

RIM TOOL.

Application filed January 15, 1923. Serial No. 612,600.

*To all whom it may concern:*

Be it known that I, ALBERT S. WALLACE, a citizen of the United States, and a resident of the city of Chicago, in the county of Cook and State of Illinois, have invented certain new and useful Improvements in a Rim Tool; and I do hereby declare that the following is a full, clear, and exact description of the same, reference being had to the accompanying drawings, and to the numerals of reference marked thereon, which form a part of this specification.

This invention relates to a rim tool adapted for contracting and expanding a demounted rim in order to remove or replace a tire with respect thereto, and comprises novel clamping mechanism, as will be more particularly hereinafter described and pointed out in the appended claims.

In the accompanying drawings which illustrate a preferred form of this invention and in which similar reference numerals refer to similar features in the different views:

Figure 1 is a fragmentary elevational view of a demountable rim with the tool applied thereto.

Figure 2 is a view similar to Figure 1 but showing the rim in contracted position.

Figure 3 is an enlarged elevational view of one of the clamps.

In the illustrated embodiment of this invention, a pair of clamping members are adapted to be firmly attached upon opposite sides of the split in the rim and connected by expanding and contracting mechanism, the structure of the clamps being such that they will not slip on the rim.

Each clamping member comprises a base 1 upon which coacting hook members 2 are pivoted which are adapted to engage opposite sides of a rim. An adjustable screw 3 extends through each base 1, and a shoe or clamping element 4 is secured upon the upper end of each screw for engaging the inner periphery of the rim. The clamping elements 4 are provided with spaced tangs or prongs which slightly bite into the rim when the screws 3 are rotated in the proper direction to clamp the said elements 4 against the rim. Further, as the elements 4 are clamped against the rim, the hook members 2 are drawn downwardly thereby binding the same firmly against the rim. It will therefore be apparent that each clamp comprises opposed elements the hook member 2 and clamping plates 4, that engage the outer and inner peripheries of the tire rim that coact in firmly securing the clamps against circumferential movement during the expanding and contracting operation of the rim.

The contracting and expanding operation is effected by means of a screw 5 pivotally connected at one end to a clamping element 4 and passing through an internally threaded pinion 6 and into a hollow tubular member 7, the opposite end of which member is pivotally connected to the other clamping element 4. The pinion 6 is coaxially supported in respect to the tube 7 and is adapted to be rotated in either direction by means of a pinion 8 having an operating lever 9 firmly secured thereto.

In using this rim tool, each pair of hook members 2 are positioned upon the upper periphery of the rim upon opposite sides of the split; the clamping elements 4 being sufficiently lowered for this purpose. The screws 3 are then rotated by means of the handles 10 to raise and clamp the elements 4 against the inner periphery of the rim, whereby the clamps become firmly attached to the rim against circumferential movement. The lever 9 may then be suitably operated for rotating the pinion 8 and simultaneously rotating the pinion 6 for producing the desired longitudinal adjustment of the screw 5 for expanding or contracting th rim as is obvious.

One of the important features of this invention resides in the fact that the screw 5 and the member 7 are directly pivoted to the shoes quite close to the clamping surfaces thereof. Consequently in the operation of the screw in expanding and contracting the rim, there will be no appreciable tendency to tilt the clamps and distort the ends of the rim so that they will not properly aline as would be the case if the ends of the operating mechanism were pivoted so as to cause a tilting or turning movement of the shoes, which would occur if said ends were pivoted upon the member 1 of said clamps.

I am aware that numerous details of construction may be varied through a wide range without departing from the principles of this invention, and I therefore do not purpose limiting the patent granted otherwise than necessitated by the prior art.

I claim as my invention:

1. In a rim tool, a pair of clamps adapted for engaging spaced portions of the rim, each clamp comprising outer rim engaging members and an inner shoe engaging said rim upon opposite sides of the points of engagement of said outer rim engaging members therewith, means for holding said member and shoe against relative pivotal action and operating mechanism connected to said shoes at points adjacent the gripping faces thereof to prevent tilting movement of the clamps.

2. In a rim tool, a pair of clamps adapted for engaging spaced portions of the rim, each clamp comprising outer rim engaging hook members, a base to which said hook members are pivoted, a screw extending through said base, and a shoe carried by said screw and adapted to engage the inner periphery of the rim upon opposite sides of the point of engagement of said hook members therewith, and operating mechanism connecting the said shoes at points adjacent the gripping faces thereof to bring the thrust member nearly in line with the surface gripped.

In testimony whereof I have hereunto subscribed my name.

ALBERT S. WALLACE.